(12) United States Patent
Suzuki et al.

(10) Patent No.: US 12,448,300 B2
(45) Date of Patent: Oct. 21, 2025

(54) ELECTROLYTIC MANGANESE DIOXIDE, METHOD FOR MANUFACTURING SAME, AND USE THEREOF

(71) Applicant: TOSOH CORPORATION, Yamaguchi (JP)

(72) Inventors: Naoto Suzuki, Yamaguchi (JP); Akinori Eshita, Yamaguchi (JP); Takayuki Shoji, Miyazaki (JP)

(73) Assignee: TOSOH CORPORATION, Yamaguchi (JP)

( * ) Notice: Subject to any disclaimer, the term of this patent is extended or adjusted under 35 U.S.C. 154(b) by 772 days.

(21) Appl. No.: 17/297,179

(22) PCT Filed: Nov. 22, 2019

(86) PCT No.: PCT/JP2019/045829
§ 371 (c)(1),
(2) Date: May 26, 2021

(87) PCT Pub. No.: WO2020/110951
PCT Pub. Date: Jun. 4, 2020

(65) Prior Publication Data
US 2022/0033274 A1    Feb. 3, 2022

(30) Foreign Application Priority Data

Nov. 29, 2018  (JP) .................................. 2018-223660
Aug. 29, 2019  (JP) .................................. 2019-156545

(51) Int. Cl.
*C01G 45/02* (2025.01)
*C25B 1/21* (2006.01)
*C25B 15/027* (2021.01)
*H01M 4/50* (2010.01)

(52) U.S. Cl.
CPC ................ *C01G 45/02* (2013.01); *C25B 1/21* (2013.01); *C25B 15/027* (2021.01); *H01M 4/50* (2013.01); *C01P 2006/16* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 6,527,941 B2 | 3/2003 | Andersen et al. | |
| 9,103,044 B2* | 8/2015 | Suetsugu | H01M 6/06 |
| 2003/0170170 A1* | 9/2003 | Davis | C01G 45/02 |
| | | | 423/605 |
| 2004/0109822 A1 | 6/2004 | Davis et al. | |
| 2005/0233215 A1* | 10/2005 | Yamaguchi | C25B 1/21 |
| | | | 423/605 |
| 2009/0197169 A1* | 8/2009 | Nunome | H01M 6/06 |
| | | | 429/207 |
| 2015/0030926 A1 | 1/2015 | Suetsugu et al. | |

FOREIGN PATENT DOCUMENTS

| | | | | |
|---|---|---|---|---|
| JP | 2005-520290 A | 7/2005 | | |
| JP | 4827501 B2 | 11/2011 | | |
| JP | 2013-199422 A | 10/2013 | | |
| JP | 5428163 B2 | 2/2014 | | |
| JP | 2014-131947 A | 7/2014 | | |
| JP | 5909845 B2 | 4/2016 | | |
| JP | 2016-102228 A | 6/2016 | | |
| JP | 2017-179583 A | 10/2017 | | |
| WO | WO-2015093578 A1 * | 6/2015 | ............. | C01G 45/02 |
| WO | WO-2018180208 A1 * | 10/2018 | ............... | C25B 1/21 |

OTHER PUBLICATIONS

English translation of WO-2015093578-A1 Description (Year: 2015).*
English translation of WO-2018180208-A1 Description (Year: 2018).*
International Search Report issued in International Patent Application No. PCT/JP2019/045829, dated Feb. 10, 2020, along with an English translation thereof.
International Preliminary Report on Patentability in International Application No. PCT/JP2019/045829, dated Feb. 10, 2020, along with an English translation thereof.
Written Opinion of the International Searching Authority issued in International Patent Application No. PCT/JP2019/045829, dated Feb. 10, 2020, along with an English translation thereof.

* cited by examiner

*Primary Examiner* — Anthony J Zimmer
*Assistant Examiner* — Zachary John Baum
(74) *Attorney, Agent, or Firm* — GREENBLUM & BERNSTEIN, P.L.C.

(57) ABSTRACT

To provide electrolytic manganese dioxide excellent in cell performance in high rate discharge and middle rate discharge when used as a cathode material for alkaline manganese dry cells, and a method for its production.
Electrolytic manganese dioxide, characterized in that the average size of mesopores is at least 6.5 nm and at most 10 nm, and the alkali potential is at least 290 mV and at most 350 mV; a method for its production and its application.

9 Claims, No Drawings

ELECTROLYTIC MANGANESE DIOXIDE, METHOD FOR MANUFACTURING SAME, AND USE THEREOF

TECHNICAL FIELD

The present invention relates to electrolytic manganese dioxide and a method for its production, and its application. More particularly, it relates to electrolytic manganese dioxide to be used as a cathode active material for e.g. manganese dry cells, particularly alkaline manganese dry cells, and a method for its production.

BACKGROUND ART

Manganese dioxide is known as a cathode active material for e.g. manganese dry cells, particularly, alkaline manganese dry cells, and has such merits that it is excellent in storage stability and is inexpensive. In particular, alkaline manganese dry cells using electrolytic manganese dioxide as the cathode active material are excellent in the cell performance in a wide range of rate, that is low rate discharge, middle rate discharge and high rate discharge, and thus are widely used in digital cameras, portable information devices, game machines and toys, and further improvement in cell performance in high rate and middle rate discharge has been desired in recent years.

Heretofore, in order to improve the cell performance in high rate discharge of an alkaline manganese dry cell, electrolytic manganese dioxide has been proposed which is characterized in that in XRD measurement using CuKα as the radiation source, the half width of the (110) is at least 1.8° and less than 2.2°, the peak intensity ratio of X-ray diffraction peaks (110)/(021) is at least 0.70 and at most 1.10, and further JIS-pH (JIS K1467) is at least 1.5 and less than 5.0 (Patent Document 1). Further, electrolytic manganese dioxide has been proposed such that the potential measured in a 40 wt % aqueous KOH solution by using a mercury/mercury oxide reference electrode as the standard (hereinafter referred to as alkali potential) is high (Patent Documents 2 to 4).

Further, in order to improve the cell performance in middle rate discharge of an alkali manganese dry cell, electrolytic manganese dioxide has been proposed such that the potential measured in a 40 wt % aqueous KOH solution by using a mercury/mercury oxide reference electrode as the standard is at least 280 mV and less than 310 mV, and the full width at half maximum (FWHM) of the (110) by XRD measurement using CuKα as the radiation source is at least 2.2° and at most 2.9° (Patent Document 5).

PRIOR ART DOCUMENTS

Patent Documents

Patent Document 1: JP-A-2017-179583
Patent Document 2: Japanese Patent No. 4827501
Patent Document 3: U.S. Pat. No. 6527941
Patent Document 4: Japanese Patent No. 5428163
Patent Document 5: Japanese Patent No. 5909845

DISCLOSURE OF INVENTION

Technical Problem

Even with the electrolytic manganese dioxides disclosed in Patent Documents 1 to 5, cell performance in high rate discharge and middle rate discharge is not sufficient, and electrolytic manganese dioxide capable of further improving cell performance in high rate discharge and middle rate discharge has been desired.

It is an object of the present invention to provide electrolytic manganese dioxide which is useful as a cathode active material for a manganese dry cell and an alkaline manganese dry cell excellent in cell performance particularly in high rate discharge and middle rate discharge, and is different from conventional ones in that the average size of mesopores is large and the alkali potential is high, a method for its production and its application.

Solution to Problem

The present inventors have conducted extensive studies on electrolytic manganese dioxide to be used as a cathode active material for a manganese dry cell, particularly an alkaline manganese dry cell, and as a result, have found that by electrolytic manganese dioxide having such features that the average size of mesopores is at least 6.5 nm and at most 10 nm and the alkali potential is at least 290 mV and at most 340 mV, it becomes to be a cathode material which is excellent in cell performance particularly in high rate discharge and middle rate discharge, and thus have accomplished the present invention.

That is, the present invention resides in the following [1] to [9].

[1] Electrolytic manganese dioxide, characterized in that the average size of mesopores is at least 6.5 nm and at most 10 nm, and the alkali potential is at least 290 mV and at most 350 mV.

[2] The electrolytic manganese dioxide according to the above [1], characterized in that the sulfate group ($SO_4$) content is at most 1.5 wt %.

[3] The electrolytic manganese dioxide according to the above [1] or [2], characterized in that the sodium content is at least 10 wt ppm and at most 5,000 wt ppm.

[4] The electrolytic manganese dioxide according to any one of the above [1] to [3], characterized in that the structural water content is at least 3.70 wt %.

[5] The electrolytic manganese dioxide according to any one of the above [1] to [4], characterized in that the area of micropores is at least 46 $m^2/g$ and at most 60 $m^2/g$.

[6] A method for producing the electrolytic manganese dioxide as defined in any one of the above [1] to [5], which comprises producing manganese dioxide by electrolysis in a sulfuric acid/manganese sulfate mixed electrolyte, characterized in that the sulfuric acid concentration in the electrolyte is continuously increased from low concentration to high concentration while the manganese/sulfuric acid concentration ratio in the electrolyte is kept constant at 0.50 or lower from the initiation of electrolysis to the completion of electrolysis.

[7] The method for producing the electrolytic manganese dioxide according to the above [6], characterized in that the temperature of the electrolyte at the time of electrolysis is at least 80° C. and at most 98° C.

[8] A cathode active material for a dry cell, characterized by comprising the electrolytic manganese dioxide as defined in any one of the above [1] to [7].

[9] A dry cell characterized by comprising the cathode active material for a dry cell as defined in the above [8].

Advantageous Effects of Invention

The electrolytic manganese dioxide of the present invention achieves excellent cell performance particularly in high rate discharge and middle rate discharge when used as a cathode material of an alkaline dry cell, and further, according to the production method of the present invention, the electrolytic manganese dioxide of the present invention can be obtained.

DESCRIPTION OF EMBODIMENTS

Hereinafter, the present invention will be described in more detail.

The electrolytic manganese dioxide of the present invention is such that the average size of mesopores is at least 6.5 nm and at most 10 nm. If the average size of mesopores is smaller than 6.5 nm, the concentration polarization of the electrolyte retained in the electrolytic manganese dioxide particles tends to be large at the time of discharge and the voltage drop tends to be large, and as a result, the cell performance particularly in high rate discharge and middle rate discharge tends to be low. If the average size of mesopores is larger than 10 nm, the density of the electrolytic manganese dioxide particles tends to be low and as a result, the packing density in the dry cell tends to be low. To further improve cell performance in high rate discharge and middle rate discharge, the average size of mesopores is preferably at least 6.5 nm and at most 9.5 nm, more preferably at least 6.5 nm and at most 9.0 nm. The average size of mesopores is measured in accordance with <Measurement of average size of mesopores> in Examples.

The electrolytic manganese dioxide of the present invention is such that the alkali potential is at least 290 mV and at most 350 mV. If the alkali potential is lower than 290 mV, the cell performance particularly in high rate discharge and middle rate discharge tends to be low. If the alkali potential is higher than 350 mV, the cell performance particularly after storage tends to be low. The alkali potential is preferably at least 295 mV and at most 335 mV, more preferably at least 300 mV and at most 330 mV.

The electrolytic manganese dioxide of the present invention is such that to achieve more excellent cell performance in high rate discharge and to keep high cell performance after storage when used for an alkaline manganese dry cell, the sulfate group ($SO_4$) content is preferably at most 1.5 wt %, more preferably at most 1.3 wt %.

The electrolytic manganese dioxide of the present invention is such that to further suppress corrosion of a metal material such as a can and to further achieve more excellent cell performance in high rate discharge when used for an alkaline manganese dry cell, the sodium content is preferably at least 10 wt ppm and at most 5,000 wt ppm, more preferably at least 10 wt ppm and at most 3,000 wt ppm. Sodium content in the electrolytic manganese dioxide is derived mainly from sodium hydroxide used as a neutralizing agent.

The electrolytic manganese dioxide of the present invention is such that to further achieve more excellent cell performance in high rate discharge when used for an alkaline manganese dry cell, the structural water content is preferably at least 3.70 wt %, more preferably at least 4.10 wt %. The structural water content means water content quantitatively measured as the $H_2O$ desorption amount at from 110° C. to 320° C. by thermogravimetric analysis. By setting the temperature range of the thermogravimetric analysis to be at least 110° C., physically adsorbed $H_2O$ (water of adhesion) which desorbs at lower temperature is excluded, and by setting the upper limit to be 320° C., the water content is distinguished from $O_2$ discharged by reduction of $MnO_2$. The structural water content is measured in accordance with <Measurement of structural water content> in Examples.

The electrolytic manganese dioxide of the present invention is such that to further achieve more excellent cell performance in high rate discharge when used for an alkaline manganese dry cell, the area of micropores is preferably at least 46 $m^2/g$ and at most 60 $m^2/g$, more preferably at least 46 $m^2/g$ and at most 53 $m^2/g$. The area of micropores is measured in accordance with <Measurement of area of micropores> in Examples.

The electrolytic manganese dioxide of the present invention is such that to achieve more excellent cell performance in high rate discharge of a dry cell to be higher and to maintain the packing density of the cathode mixture in a dry cell to be higher, the BET specific surface area is preferably at least 20 $m^2/g$ and at most 30 $m^2/g$, more preferably at least 24 $m^2/g$ and at most 27 $m^2/g$.

The electrolytic manganese dioxide of the present invention is such that to readily further improve cell performance in high rate/middle rate/low rate discharge when used for an alkaline manganese dry cell, the average particle size is preferably at least 20 μm and at most 80 μm, more preferably at least 20 μm and at most 70 μm.

Now, the method for producing electrolytic manganese dioxide of the present invention will be described.

In the method for producing electrolytic manganese dioxide of the present invention, the sulfuric acid concentration in the electrolyte is continuously increased from low concentration to high concentration while the manganese/sulfuric acid concentration ratio in the electrolyte is kept constant at 0.50 or lower from the initiation of electrolysis to the completion of electrolysis, whereby electrolytic manganese dioxide such that the average size of mesopores is at least 6.5 nm and at most 10 nm and the alkali potential is at least 290 mV and at most 350 mV can be produced.

In the method for producing electrolytic manganese dioxide of the present invention, the sulfuric acid concentration in the electrolyte is continuously increased from low concentration to high concentration, and as the low concentration, the sulfuric acid concentration at the initiation of electrolysis is preferably at least 15 g/L and at most 40 g/L, and as the high concentration, the sulfuric acid concentration at the completion of electrolysis is preferably at least 45 g/L and at most 75 g/L, and the sulfuric acid concentration at the initiation of electrolysis is more preferably at least 20 g/L and at most 40 g/L, and as the high concentration, the sulfuric acid concentration at the completion of electrolysis is more preferably at least 45 g/L and at most 65 g/L.

As the electrolyte in the electrolytic cell, a sulfuric acid/manganese sulfate mixed solution is used. Here, the sulfuric acid concentration is a value excluding sulfate ions of manganese sulfate.

The method for producing electrolytic manganese dioxide of the present invention is not particularly limited, and to increase the current efficiency and to suppress evaporation of the electrolyte at the time of electrolysis, the temperature of the electrolyte is preferably at least 80° C. and at most 98° C., more preferably at least 90° C. and at most 97° C.

In the method for producing electrolytic manganese dioxide of the present invention, the manganese concentration in the electrolyte feed solution is not limited and may, for example, be preferably at least 20 g/L and at most 60 g/L, more preferably at least 30 g/L and at most 50 g/L.

In the method for producing electrolytic manganese dioxide of the present invention, the electrolysis current density is not limited and to increase the production efficiency and to improve the electrodeposition state of the electrolytic manganese dioxide, it is preferably at least 0.2 A/dm$^2$ and at most 0.7 A/dm$^2$, more preferably at least 0.3 A/dm$^2$ and at most 0.6 A/dm$^2$.

The method for producing electrolytic manganese dioxide of the present invention is to mill the electrolytic manganese dioxide obtained by the electrolysis. For the milling, for example, a roller mill, a jet mill, etc. may be used. The roller mill may, for example, be a centrifugal roller mill, a vertical type Loesche mill, etc. Among roller mills, in view of excellency in cost and durability and being suitable for industrial use, preferred is a roller mill which is capable of milling a raw material having such a hardness that the micro Vickers hardness is at least 400 HV (JIS Z2244), and which has a mill motor of at least 20 kW and at most 150 kW.

There is no particular limitation as to the method of using the electrolytic manganese dioxide of the present invention as a cathode active material for an alkaline manganese dry cell, and by a known method, it may be mixed with additives and used as a cathode mixture. For example, to the electrolytic manganese dioxide (cathode active material), graphite for imparting conductivity, an electrolyte, etc. may be added to prepare a mixed powder, which may be press-molded in a disc-shape or ring-shape to obtain a powder molded body which is useful as a cathode mixture. The cathode mixture, a negative electrode, a negative electrode current collector, a separator and an electrolyte are put in a cathode can, which is sealed to obtain a cell (dry cell).

EXAMPLES

Now, the present invention will be described in further detail with reference to Examples and Comparative Examples, but the present invention is by no means limited by these Examples.

<Measurement of Average Size of Mesopores>

The average size of mesopores of electrolytic manganese dioxide was measured as follows.

The mesopore size was measured by using high precision multi-sample gas adsorption amount measuring apparatus (Autosorb-iQ, trade name, manufactured by Anton Paar). The electrolytic manganese dioxide was dehydrated at 150° C. for 4 hours in vacuum, and then using argon as the adsorbent, the argon adsorption amount was measured at 87 K within a pressure range of from 0.0001 to 760 Torr. NLDFT was applied to the obtained adsorption isotherm to calculate the pore size distribution, and the pore volume and the pore area of pores within a range of from 2.02 to 49.03 nm were respectively taken as the mesopore volume and the mesopore area. In NLDFT, fitting was conducted using a zeolite/silica cylindrical pore model. The average size of mesopores was calculated from (4× mesopore volume/mesopore area).

<Measurement of Alkali Potential>

The alkali potential of electrolytic manganese dioxide was measured in a 40 wt % aqueous KOH solution as follows.

To 3 g of the electrolytic manganese dioxide, 0.9 g of graphite as a conductive agent was added to obtain a mixed powder, and 4 ml of a 40 wt % aqueous KOH solution was added to this mixed powder, to obtain a mixture slurry of the electrolytic manganese dioxide, graphite and the aqueous KOH solution. The potential of the mixture slurry was measured, using a mercury/mercury oxide reference electrode as the standard, and the obtained value was taken as the alkali potential of the electrolytic manganese dioxide.

<Measurement of Sulfate Group and Sodium Contents>

The sulfate group and sodium contents in electrolytic manganese dioxide were quantitatively measured by dissolving the electrolytic manganese dioxide in nitric acid and hydrogen peroxide and measuring the obtained solution by ICP.

<Measurement of Structural Water Content>

The structural water content of electrolytic manganese dioxide was measured using a thermogravimetric analyzer (TG/DTA6300, trade name, manufactured by Seiko Instruments Inc.) as follows.

Water of adhesion was removed by heating the electrolytic manganese dioxide in the thermogravimetric analyzer in a stream of nitrogen up to 110° C. and holding it for 16 hours. Then, the electrolytic manganese dioxide was heated to 240° C. and held for 12 hours, and further heated to 320° C. and held for 12 hours, and the weight loss from 110° C. to 320° C. was taken as the weight of the structural water. Then, the electrolytic manganese dioxide was heated to 620° C. and held for 1 hour to remove substances which can desorb from the electrolytic manganese dioxide, and the weight after drying was obtained. By dividing the weight of the structural water by the weight after drying, the structural water content of the electrolytic manganese dioxide was obtained. The heating rate for the measurement was 10° C./hour. The desorbed substance from 110° C. to 320° C. being $H_2O$ was confirmed by mass spectrometric analysis of the desorbed substance.

<Measurement of Area of Micropores>

The area of micropores of electrolytic manganese dioxide was measured as follows.

In the pore size distribution calculated by NLDFT as described above, the pore area of pores within a range of from 0.41 to 2.02 nm was taken as the area of micropores.

<Measurement of BET Specific Surface Area>

The BET specific surface area of electrolytic manganese dioxide was measured by nitrogen adsorption by a BET one point method. As the measuring apparatus, a gas adsorption specific surface area measuring apparatus (Flow Sorb III, trade name, manufactured by Shimadzu Corporation) was used. Prior to the measurement, the electrolytic manganese dioxide was dehydrated by heating at 150° C. for 1 hour.

<Measurement of Average Particle Size>

The average particle size (50% size) of electrolytic manganese dioxide was measured by a particle size distribution measuring apparatus (Microtrac MT3300EXII, trade name, manufactured by MicrotracBEL Corp.) at HRA mode. No dispersion treatment such as ultrasonic dispersion was conducted at the time of measurement.

<Measurement of Cell Performances in High Rate Discharge and Middle Rate Discharge>

The cell performances in high rate discharge and middle rate discharge were measured as follows.

65 g of the electrolytic manganese dioxide, 2.9 g of graphite and 5.1 g of a 37 wt % aqueous potassium hydroxide solution were mixed by a V mixer for 20 minutes, calendered by a roller compactor under a pressure of 30 MPa, and further classified by a sieve into 180 μm to 1 mm to obtain cathode mixture granules. 3.5 g of the cathode mixture granules were pressed by a mold having an outer diameter of 13 mm and an inner diameter of 9 mm under 2.7 t/cm$^2$ to prepare a ring-shaped molded product. Three such ring-shaped molded products were put in a cathode can for AA dry cell and pressed under 2.7 t/cm$^2$ to conduct secondary molding.

In the inside of the ring-shaped secondarily molded cathode mixture, a cylindrical separator was set, 1.6 g of a 37 wt % aqueous potassium hydroxide solution was dropped on the bottom of the dry cell, the dry cell was left at rest for 30 minutes, 6 g of an anode gel having 67 wt % of Zn particles mixed with a 37 wt % aqueous potassium hydroxide solution having polyacrylic acid dissolved, was injected into the inside of the cylindrical separator, and the cathode can was sealed with an anode can equipped with a current collecting rod to prepare a dry cell. The dry cell was stored at 20° C. for 7 days, and the number of 1.5 W pulses was counted in accordance with 1.5 W discharge method as stipulated by American National Standards Institute (ANSI) and was taken as the cell performance in high rate discharge, and the discharge capacity measured in accordance with 0.25 A discharge method was taken as the cell performance in middle rate discharge. Measurement was conducted at 20° C.

Example 1

Electrolysis was conducted by using an electrolytic cell which has a heating device, and a titanium plate as an anode and a graphite plate as a cathode, which are suspended so as to face each other.

Using as an electrolyte feed solution an aqueous manganese sulfate solution with a manganese concentration of 45 g/L, and keeping the electrolysis current density to be 0.34 A/dm$^2$ and the manganese/sulfuric acid concentration ratio in the electrolyte to be 0.25, electrolysis was conducted for 15 days while the sulfuric acid concentration in the electrolyte was continuously increased from 38 g/L at the initiation of electrolysis to 63 g/L at the completion of electrolysis. The temperature of the electrolyte was 93° C. until the sulfuric acid concentration reached 40 g/L and changed to 97° C. when the concentration reached 40 g/L.

After the electrolysis, the electrodeposited plate-shaped electrolytic manganese dioxide was washed with pure water and then milled to obtain a milled product of the electrolytic manganese dioxide. Then, this electrolytic manganese dioxide milled product was put in a water bath and stirred, and an aqueous sodium hydroxide solution was added, to conduct a neutralization treatment so as to bring the pH of the slurry to be 4.2. Then, the electrolytic manganese dioxide was washed with water, filtered for separation and dried, and subjected to a sieve with an opening of 63 µm to obtain an electrolytic manganese dioxide powder. Of the obtained electrolytic manganese dioxide, the results of evaluation (the average size of mesopores, the alkali potential, the sulfate group content, the sodium content, the content of structural water, the area of micropores, the BET specific surface area, the average particle size, the cell performance in high rate discharge and the cell performance in middle rate discharge, the same applies hereinafter) are shown in Table 1.

Example 2

Electrolysis was conducted in the same method as in Example 1 except that the sulfuric acid concentration at the initiation of electrolysis was 30 g/L, and that the sulfuric acid concentration at the completion of electrolysis was 49 g/L. The results of evaluation of the obtained electrolytic manganese dioxide are shown in Table 1.

Example 3

Electrolysis was conducted in the same method as in Example 1 except that the manganese/sulfuric acid concentration ratio in the electrolyte was kept at 0.34, that the sulfuric acid concentration at the initiation of electrolysis was 38 g/L, and that the sulfuric acid concentration at the completion of electrolysis was 56 g/L. The results of evaluation of the obtained electrolytic manganese dioxide are shown in Table 1.

Comparative Example 1

Electrolysis was conducted in the same method as in Example 3 except that the manganese/sulfuric acid concentration ratio in the electrolyte was 0.75 for the first 10 days and was 0.34 for the latter 5 days, and that the temperature of the electrolyte was kept at 97° C. from the initiation to the completion of electrolysis. The results of evaluation of the obtained electrolytic manganese dioxide are shown in Table 1.

It is found from Table 1 that by producing electrolytic manganese dioxide at a manganese/sulfuric acid concentration ratio and at a sulfuric acid concentration in each of Examples 1 to 3, the obtained electrolytic manganese dioxide has a larger average size of mesopores, a higher apparent alkali potential and more excellent cell performance in high rate discharge and middle rate discharge, as compared with Comparative Example 1.

The entire disclosures of Japanese Patent Application No. 2018-223660 filed on Nov. 29, 2018 and Japanese Patent Application No. 2019-156545 filed on Aug. 29, 2019 including specifications, claims, drawings and summaries are incorporated herein by reference in their entireties.

INDUSTRIAL APPLICABILITY

Since the electrolytic manganese dioxide of the present invention has specific average size of mesopores and alkali potential, it is useful as a cathode active material for manganese dry cells, in particular alkaline manganese dry cells, excellent in cell performance particularly in high rate discharge and middle rate discharge.

TABLE 1

|  | Average size of mesopores (nm) | Alkali potential (mV) | SO$_4$ Content (wt %) | Na Content (wtppm) | Structural water content (wt %) | Area of micropores (m$^2$/g) | BET Specific surface area (m$^2$/g) | Average particle size (µm) | Cell performance in high rate discharge (number of 1.5 W pulses) | Cell performance in middle rate discharge (mAh/g) |
|---|---|---|---|---|---|---|---|---|---|---|
| Ex. 1 | 7.96 | 327 | 1.26 | 1510 | 4.35 | 47.0 | 25.6 | 23 | 117 | 223 |
| Ex. 2 | 8.25 | 317 | 1.26 | 1460 | 4.21 | 49.7 | 24.7 | 24 | 109 | 220 |
| Ex. 3 | 7.74 | 335 | 1.26 | 1550 | 4.28 | 50.1 | 26.1 | 22 | 105 | 218 |
| Comp. Ex. 1 | 6.38 | 298 | 1.19 | 1200 | 3.53 | 45.2 | 27.3 | 39 | 96 | 212 |

The invention claimed is:

1. An electrolytic manganese dioxide, wherein
the electrolytic manganese dioxide has a BET specific surface area of at least 20 m²/g and at most 30 m²/g,
the average size of mesopores is at least 6.5 nm and at most 10 nm,
the alkali potential is at least 300 mV and at most 350 mV, and
the structural water content is at least 4.10 wt %.

2. The electrolytic manganese dioxide according to claim 1, wherein the sulfate group (SO$_4$) content is at most 1.5 wt %.

3. The electrolytic manganese dioxide according to claim 1, wherein the sodium content is at least 10 wt ppm and at most 5,000 wt ppm.

4. The electrolytic manganese dioxide according to claim 1, wherein the area of micropores is at least 46 m²/g and at most 60 m²/g.

5. A method for producing the electrolytic manganese dioxide as defined in claim 1, which comprises producing manganese dioxide by electrolysis in a sulfuric acid/manganese sulfate mixed electrolyte, wherein the sulfuric acid concentration in the electrolyte is continuously increased from low concentration to high concentration while the manganese/sulfuric acid concentration ratio in the electrolyte is kept constant at 0.50 or lower from the initiation of electrolysis to the completion of electrolysis.

6. The method for producing the electrolytic manganese dioxide according to claim 5, wherein the temperature of the electrolyte at the time of electrolysis is at least 80° C. and at most 98° C.

7. A cathode active material for a dry cell, characterized by comprising the electrolytic manganese dioxide as defined in claim 1.

8. A dry cell characterized by comprising the cathode active material for the dry cell as defined in claim 7.

9. An electrolytic manganese dioxide, wherein
the electrolytic manganese dioxide has a BET specific surface area of at least 24 m²/g and at most 26.1 m²/g,
the average size of mesopores is at least 6.5 nm and at most 10 nm,
the alkali potential is at least 300 mV and at most 335 mV, and
the structural water content is at least 4.10 wt %.

* * * * *